Nov. 24, 1964 R. B. COTTON 3,158,343
CONTROLLED DRAG MEANS
Filed July 23, 1963 9 Sheets-Sheet 1

INVENTOR
Robert B. Cotton
BY Birch and O'Brien
ATTORNEYS

Nov. 24, 1964    R. B. COTTON    3,158,343
CONTROLLED DRAG MEANS
Filed July 23, 1963    9 Sheets-Sheet 4

INVENTOR
Robert B. Cotton

BY *Birch and O'Brien*

ATTORNEYS

Nov. 24, 1964  R. B. COTTON  3,158,343
CONTROLLED DRAG MEANS

Filed July 23, 1963  9 Sheets—Sheet 5

LET. PARACHUTE DIA. = 28 FT

SEQUENCE OF OPERATION →

AIRPLANE SPEED = 180K
DRAG = 400#

180K ——— 10,000 lb.

150 K ——— 10,000

70K ——— 10,000

INVENTOR
Robert B. Cotton
BY *Birch and O'Brien*
ATTORNEYS

Nov. 24, 1964 R. B. COTTON 3,158,343
CONTROLLED DRAG MEANS
Filed July 23, 1963 9 Sheets-Sheet 6

INVENTOR
Robert B. Cotton

BY *Birch and O'Brien*

ATTORNEYS

Nov. 24, 1964                R. B. COTTON                3,158,343
                          CONTROLLED DRAG MEANS
Filed July 23, 1963                                  9 Sheets-Sheet 7

INVENTOR
Robert B. Cotton

BY *Birch and O'Brien*

ATTORNEYS

Nov. 24, 1964  R. B. COTTON  3,158,343
CONTROLLED DRAG MEANS
Filed July 23, 1963  9 Sheets-Sheet 8

INVENTOR
Robert B. Cotton
BY Birch and O'Brien
ATTORNEYS

Nov. 24, 1964  R. B. COTTON  3,158,343
CONTROLLED DRAG MEANS

Filed July 23, 1963  9 Sheets-Sheet 9

BRAKING DISTANCE, FT.
(FROM $V_i$ TO 25 M.P.H.)

BRAKING DISTANCE ~ ROAD GRADE

INVENTOR
Robert B. Cotton

BY *Birch and O'Brien*

ATTORNEYS

United States Patent Office 3,158,343
Patented Nov. 24, 1964

3,158,343
CONTROLLED DRAG MEANS
Robert B. Cotton, Media, Pa., assignor to All American
Engineering Company, Wilmington, Del., a corporation
of Delaware
Filed July 23, 1963, Ser. No. 297,121
5 Claims. (Cl. 244—110)

This invention relates to controllable drag means, and more particularly to controlled drag parachute means and systems utilizing same.

It is an object of this invention to provide a new and novel variable drag parachute.

It is another object of this invention to provide a self-programming constant drag parachute.

It is another object of this invention to provide a self-programming constant drag parachute with an override means for selectively varying the drag of the said parachute.

Another object of this invention is to provide a personnel parachute of the self-programming constant drag type.

Another object of this invention is to provide a personnel parachute wherein the drag of the parachute may be manually controlled during descent.

Still another object of this invention is to provide a personnel parachute of the self-programming constant drag type with a manual override means for selectively varying the drag of said parachute.

Yet another object of this invention is to provide a new and novel personnel parachute wherein the weight of the said parachute will be materially reduced from that of present day personnel parachutes.

Another object of this invention is to provide a new and novel self-programming constant drag parachute aircraft arresting system which is self-contained by the aircraft.

Still another object of this invention is to provide a parachute type aircraft arresting system, which is self-contained by the aircraft, including novel override means for selectively varying the drag of the parachute therein.

Yet another object of this invention is to provide a new and novel self-programming constant drag parachute aircraft arresting system, which is self-contained by the aircraft, including override means for selectively varying the drag of the constant drag parachute therein.

Another object of this invention is to provide a self-programming constant drag energy absorbing system for moving vehicles which is self-contained in the said vehicles.

Yet another object of this invention is to provide a new and novel class of highly efficient energy absorbing means.

These and other objects of this invention will become more fully apparent with reference to the following specification and drawings which relate to several preferred embodiments of the invention.

Figure 6:
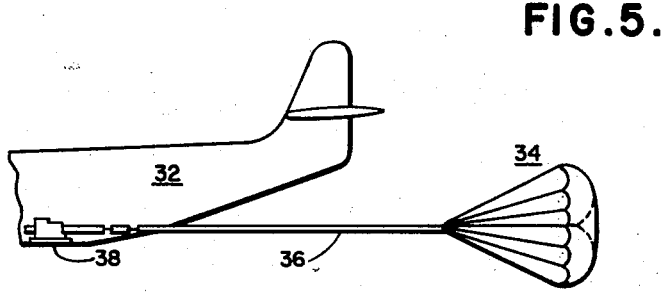
FIG. 6 is a side elevation of another embodiment of the invention providing a drag parachute arresting system for aircraft.
Figure 9:
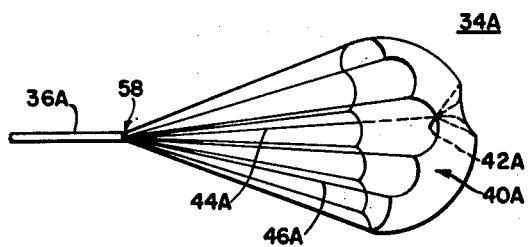
Figure 8A:
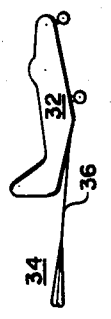
Figure 8B:
Figure 8C:
Figure 8D:
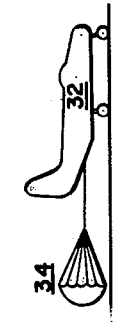
Figure 8A:
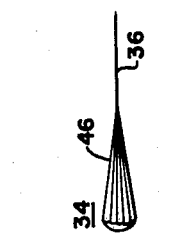
Figure 8B:
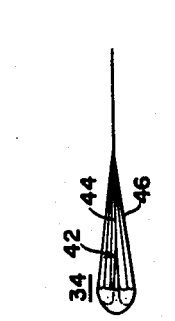
Figure 8C:
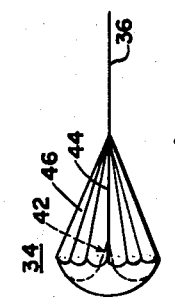
Figure 8D:
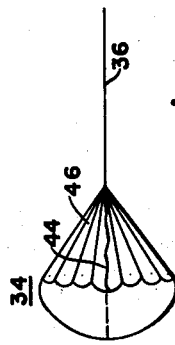
Figure 10:
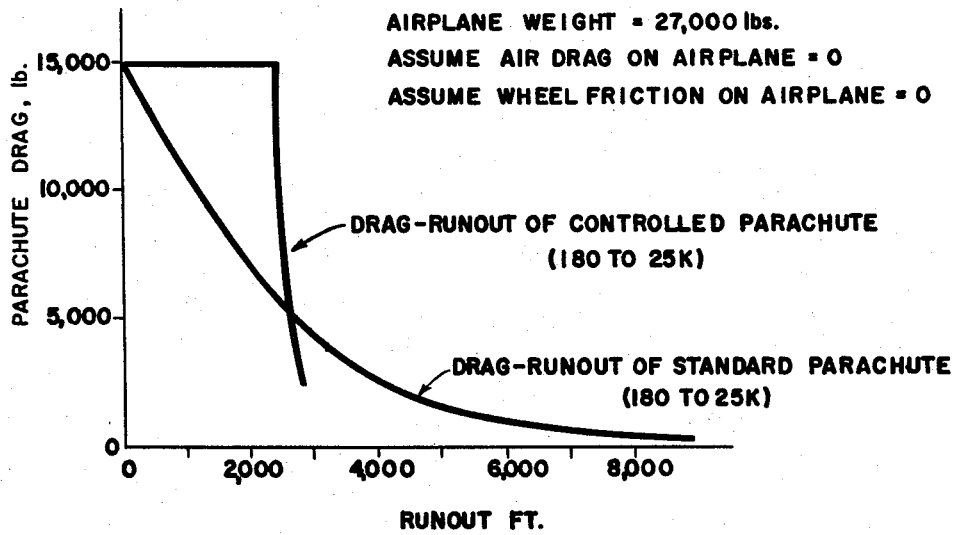
Figure 11:
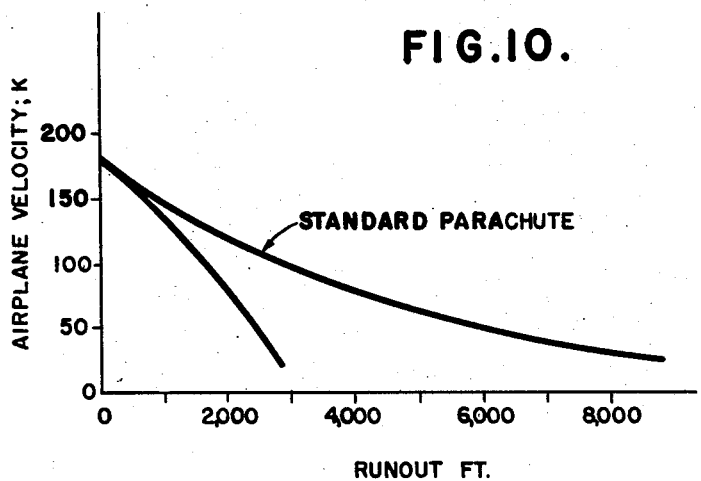
Figure 12:
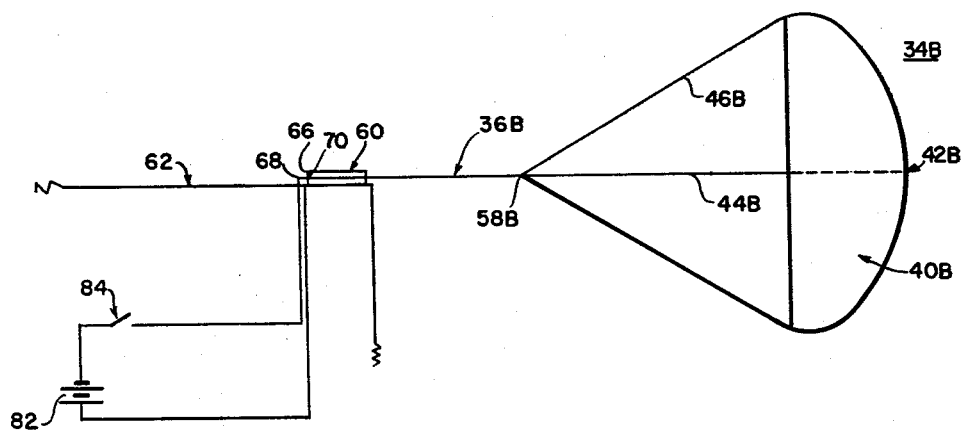
Figure 13:
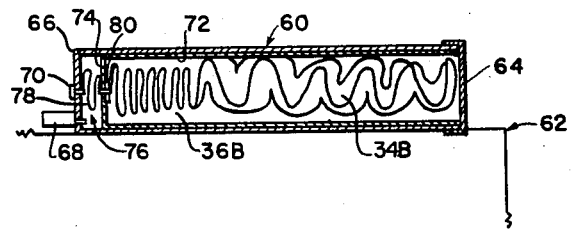
Figure 14:
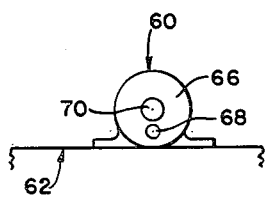
Figure 15:
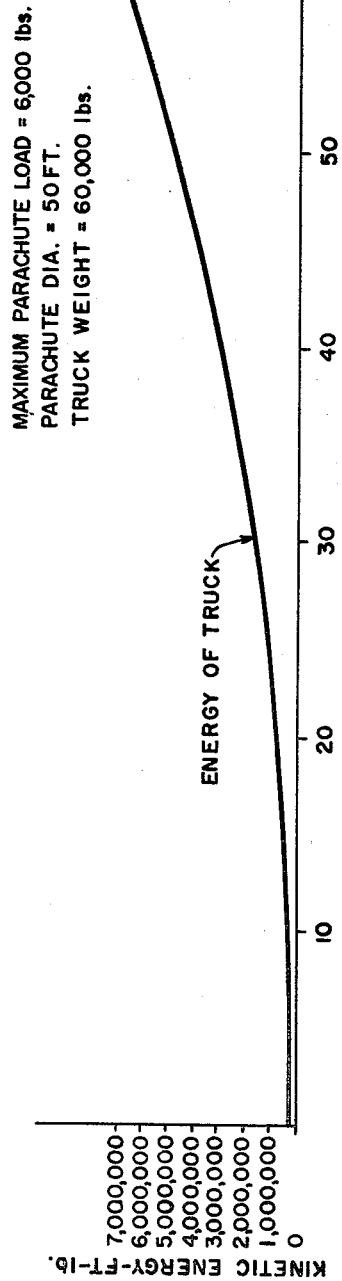
Figure 16:
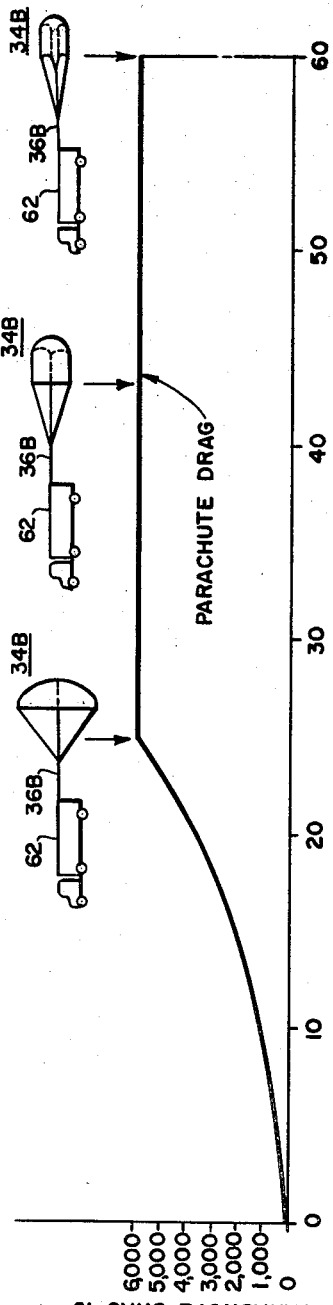
Figure 17:
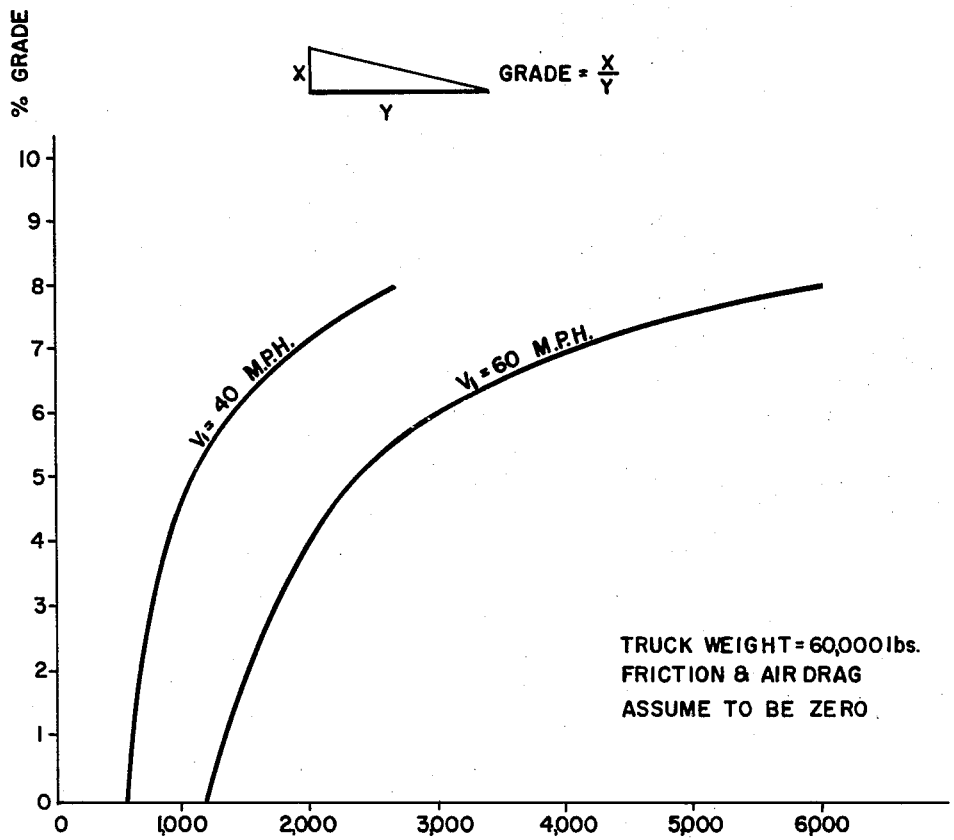

FIGS. 8($a$)–($d$) and ($a'$) to ($d'$) are respectively paired schematic illustrations of the variable drag operational sequence of the system of FIG. 6;

FIG. 9 is a side elevation of a self-programming drag means;

FIG. 10 is a graphic comparison of the drag vs. drag-runout characteristics of a standard parachute and a controlled parachute of the present invention;

FIG. 11 is a graphic comparison of the aircraft velocity vs. runout characteristics of an aircraft incorporating a standard drag parachute and a controlled drag parachute of the present invention;

FIG. 12 is a side elevational schematic of a self-programming drag chute emergency braking system for land vehicles;

FIG. 13 is a side elevation in cross-section of a parachute storing and actuating means for the system of FIG. 12;

FIG. 14 is an end view of the storing and actuating means of FIGURE 13;

FIG. 15 is a graphic illustration of an energy vs. velocity characteristic of a land vehicle, specifically a truck;

FIGURE 16 is a combined graphic and schematic illustration of a parachute drag vs. velocity characteristic and an operating sequence of the system of FIG. 12; and FIG. 17 is a graphic illustration of a braking distance vs. road grade characteristic of the system of FIG. 12.

*Parachute for Personnel*

Figure 1:
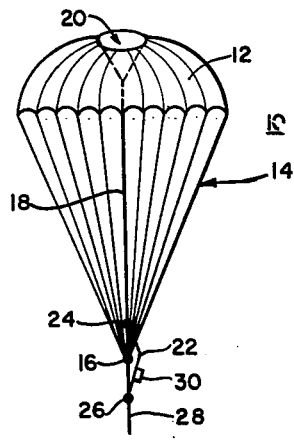
FIG. 1 is a side elevation of a parachute embodying the present invention in a fully open condition.
Figure 2:
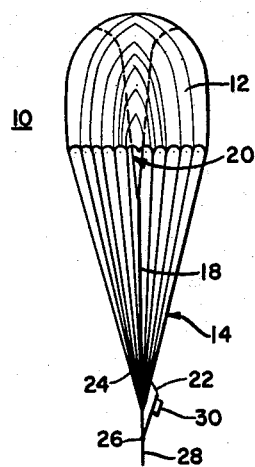
FIG. 2 is a side elevation of the parachute of FIG. 1 in a partially collapsed condition.

Referring in detail to the drawings and more particularly to FIGS. 1 and 2, the parachute 10 is shown comprising a canopy 12, shroud lines 14 having a common anchor point or connection 16, and a control line 18 running between the connection 16 and the apex 20 of the canopy 12. The control line 18 is made of a relatively non-elastic material such as steel cable while the shroud lines 14 are made of highly elastic material such as nylon line which will stretch under load on the order of 21% elongation without failing.

As will be hereinafter more fully described, manual control over the drag or "g" load exerted by the parachute 10 and consequently the rate of fall of personnel using such a parachute, is provided in the form of a control strap 22 extending from a point 24 on the control line 18, above the common connection 16, to a point 26 on the harness line 28 of the parachute 10 below the common connection 16. A handgrip 30 is provided on the control strap 22. The harness line 28 may comprise an integral extension of the control line 18 or may be a separate strap or line of any suitable material anchored to the common connection 16.

*Operation*

In operation, referring to FIG. 1, the parachute 10 is shown in its full open position in which there is a minimum elongation of the elastic shroud lines 14. However, the shroud lines 14 elongate in an amount proportional to the drag load on the canopy 12 of the parachute 10 such that the apex 20, in effect, is lowered with respect to the full open position thereof in FIG. 1 and causes the effective diameter of the canopy 12 to decrease accordingly.

A decrease in the diameter of the canopy 12 causes a corresponding decrease in the effective drag area of the parachute 10 and causes a reduced drag load at any given velocity at which the said decrease takes place. Thus, by proper design of the shroud lines 14 with respect to the other characteristics of the parachute 10, the maximum drag which will be exerted under any conditions may be preselected.

Figure 3:
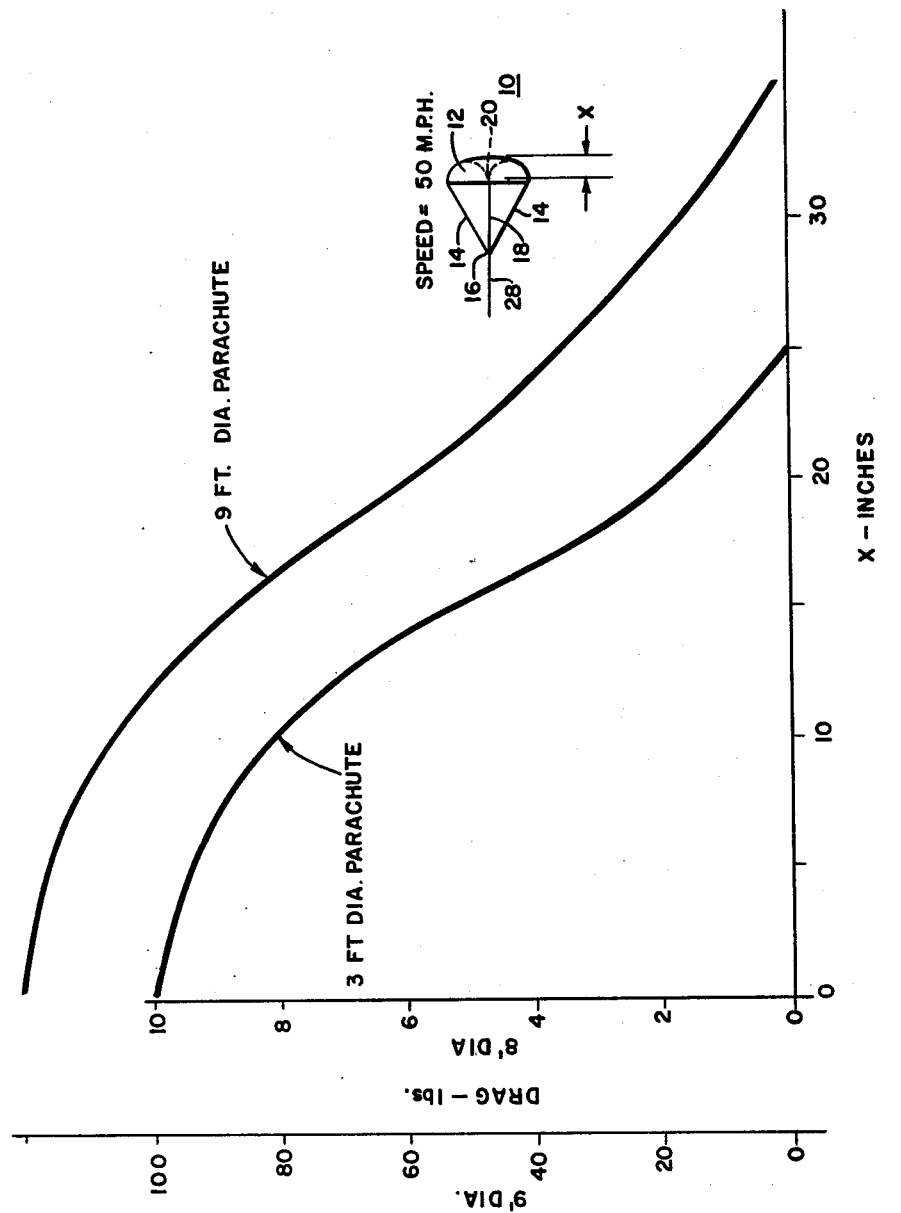
FIG. 3 is a graphic illustration of the effect of manual variable drag control of two different sized parachutes of the structure shown in FIGS. 1 and 2.

For example, in FIG. 3 there are two graphic functions of drag in pounds vs. shroud line elongation in inches for parachutes three (3) feet and nine (9) feet in diameter, respectively, the elongation X of the shroud lines 14 being shown schematically as equivalent to the displacement of the apex 20 of the canopy 12 from its full open position. Both curves represent the control which may be exercised over the drag of the respective parachutes at a velocity of fifty miles per hour. Thus, the drag characteristics of the parachute of FIGS. 1 and 2 may be manually varied or programmed by pulling on the handle 30 of the control strap 22, whereby the control line 18 will be constrained to displace the apex 20 of the canopy 12 and vary the drag of the parachute 10.

Figure 4:
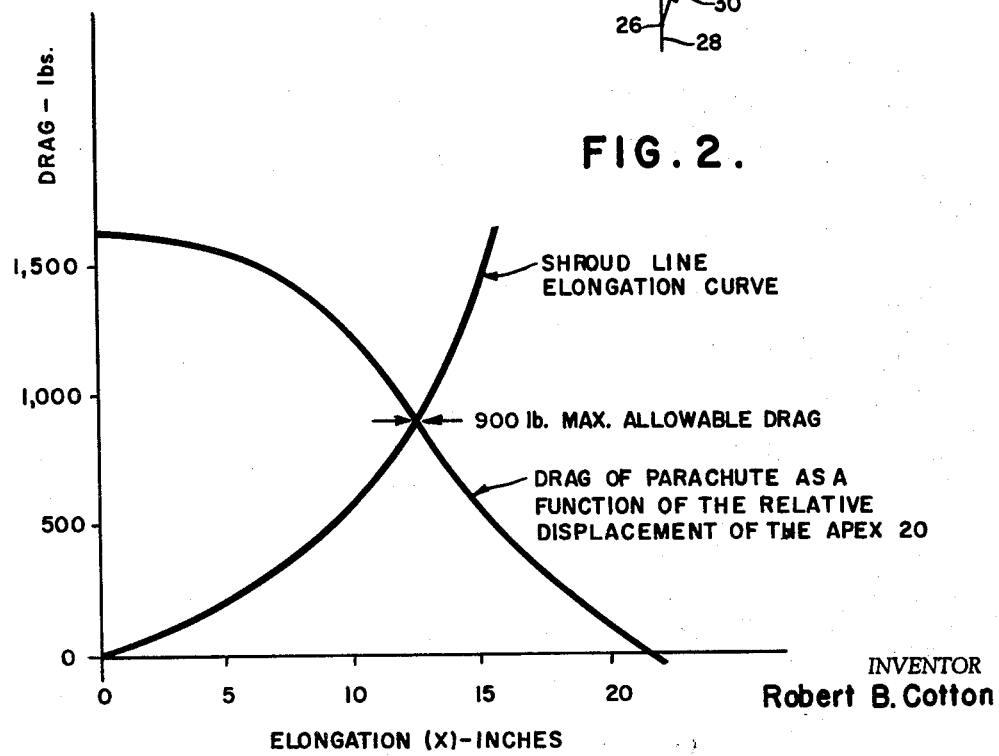
FIG. 4 is a graphic illustration of the relationship between the manual and automatic variable drag control of a parachute having the structure shown in FIGS. 1 and 2.

As shown in FIG. 4, given a drag vs. elongation (X) characteristic curve for a particular set of shroud lines and a drag vs. apex displacement (X) curve for a given parachute diameter, the intersection of the two curves provides the maximum drag solution of these particular parameters or boundary conditions. The solution shown here, for example, may be for a standard military personnel parachute with shroud line characteristics selected such that the maximum drag exerted on personnel using such a parachute would be nine hundred pounds.

Figure 5:
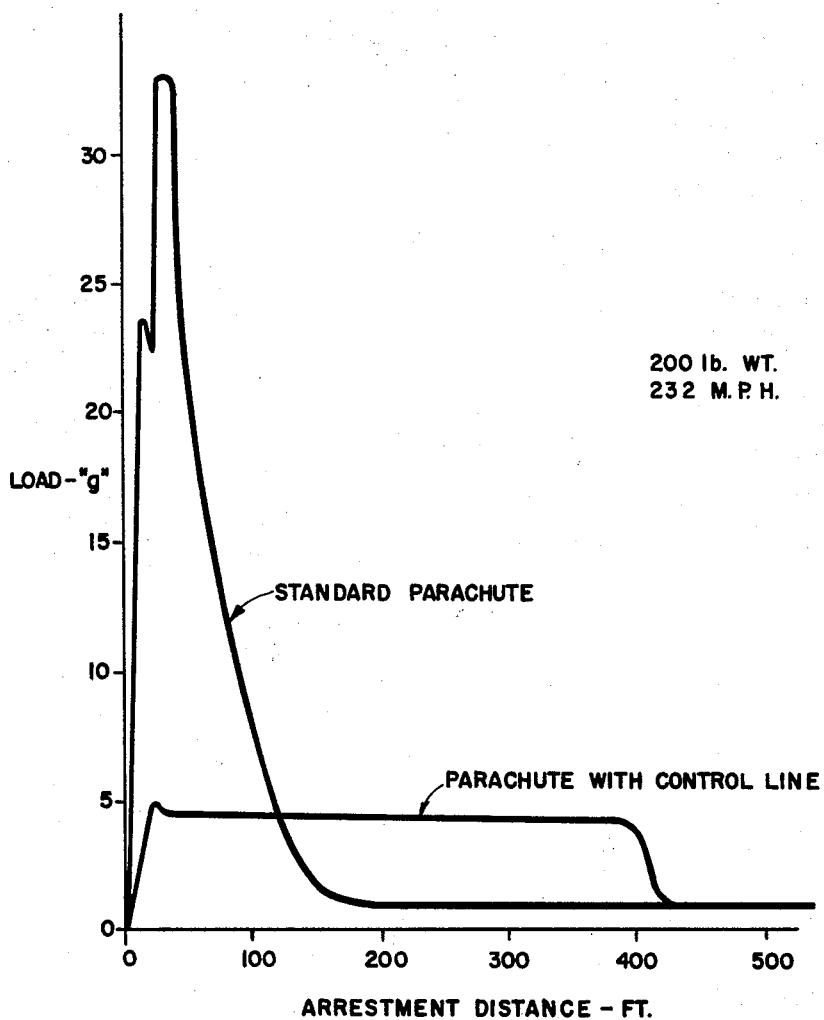
FIG. 5 is a graphic illustration of the difference between the opening shock of a standard parachute and a parachute of the present invention.

Referring next to FIG. 5, another consideration of the beneficial results of this invention will now be set forth.

Upon the initial opening of the parachute 10, during a descent, the elongation of the shroud lines 14 in response to the initial opening shock or "g" load on the parachute 10, results in a partial spilling of the canopy 12 to the relative displacement of the apex 20 in the canopy 12, the apex 20 being fixed by the non-elastic control line 18 and the canopy 12 raising via the elongation of the shroud lines 14.

As shown in FIG. 5, a standard military personnel parachute providing a parachute descent for a two hundred pound body at a speed of two hundred and thirty-two miles per hour will impart a very high transient initial deceleration shock on the body of greater than thirty units of gravity ("g") which rapidly reduces to approximately one "g" after approximately two hundred feet of arrestment or descent distance has been traversed after opening of the parachute. This same parachute, if provided with a control line to fix the position of the apex of the parachute canopy, such as shown at 18 in FIGS. 1 and 2, will result in an initial shock load of only five "g," due to the relative displacement of the apex 20 in the canopy 12, which will remain a substantially constant drag load over approximately four hundred feet of descent at which time it rapidly reduces to a one "g" drag load and the characteristic curve thereof, in FIG. 5, meets the curve of the standard parachute. Thus, a parachute constructed under the present invention is self-programming to prevent high initial loading and provide constant drag loading over a substantial arrestment distance by controlling the effective diameter of its own canopy.

*Parachute Aircraft Arresting Gear*

Figure 7:
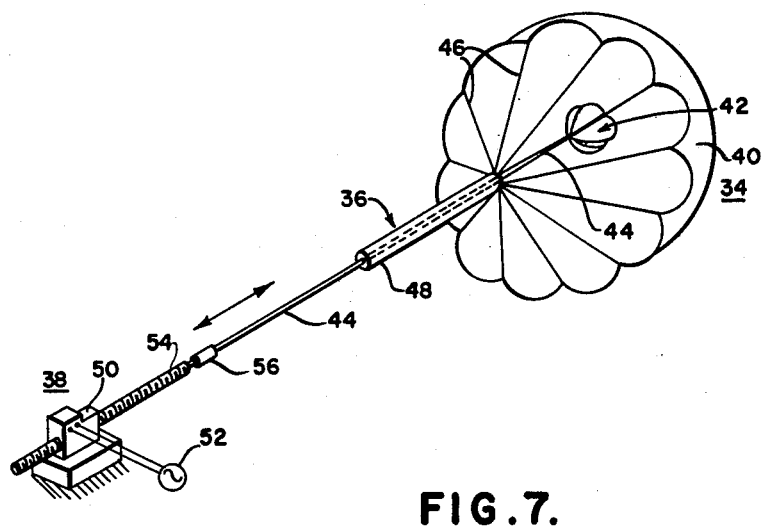
FIG. 7 is a detailed perspective of the variable drag control of FIG. 6.

Referring now to FIGS. 6, 7 and 9, a self-contained parachute arresting gear or system is shown as comprising an aircraft 32, a parachute 34 trailing the aircraft 32, a flexible connecting means 36 for connecting the parachute 34 with the aircraft 32, and a screw or worm type parachute actuator mechanism 38 inboard of the aircraft.

The parachute 34 and the connecting means 36 may take one of several forms, two embodiments of which are shown in FIGS. 7 and 9.

Referring first to FIG. 7, the parachute 34 comprises a canopy 40 having its apex 42 connected to the actuator 38 via a control line 44 such as a steel cable or other relatively inelastic connecting means and a plurality of shroud lines 46 connected with one end of a flexible nylon tube 48 comprising the connecting means 36.

The parachute actuator 38 comprises an electric motor 50 energized from a suitable source 52, said motor 50 having an internally threaded hollow shaft (not shown) for effecting rotation and resulting linear longitudinal translation of a screw shaft 54. One end of the screw shaft 54 is connected with the control line 44 of the parachute 34 via a suitable rotary coupling 56.

Referring next to FIG. 9, a self-programming embodiment of the aircraft arresting means is shown comprising a parachute 34–A having a tape or cable 36–A connecting it to an aircraft (not shown) by means of a common connection 58 with the shroud lines 46–A of the parachute 34–A. A steel or other relatively inelastic cable 44–A is connected between the said common connection 58 and the apex 42–A of the canopy 40–A of the parachute 34–A.

The shroud lines 46–A are made of nylon or the like which is highly elastic relative to the steel cable 44–A. This relative elasticity results in the self-programming characteristics of the parachute 34–A as will be hereinafter more fully described.

*Operation*

Referring now to FIGS. 6, 7 and 8, the operation of the embodiment of FIG. 7 will now be described.

In FIGS. 8(*a*) an aircraft 32 is shown approaching a runway surface 60 with the drag chute 34 trailing behind on the connecting means 36 in a closed minimum drag condition. This is effected by having the screw shaft 54 (FIG. 7) driven all the way to the left as shown such that the steel cable 44 will draw the apex 42 a maximum distance into the drag parachute 34 causing the effective drag area of the canopy 40 of said parachute, due to the relative elongation of the shroud lines 46 with respect to the apex 42. This condition of the parachute 34 is illustrated schematically in FIG. 8(*a'*).

As the aircraft 32 touches down on the runway 60 as shown at FIG. 8(*b*) the parachute 34 assumes the condition illustrated at FIG. 8(*b'*). This is accomplished by the rotation of the electric motor 50 in the parachute actuator 38 at a speed having a predetermined relationship to the landing speed of the aircraft, and at this stage of the landing cycle, the screw shaft 54 has translated to the right, as shown in FIG. 7, whereby the apex 42 of the canopy 40 moves away from the aircraft 32 and causes a relative shortening of the shroud lines 46 with respect to the said apex. Thus, a larger effective drag area of the canopy 42 is progressively presented.

The motor 50 now continues to run and thus progressively increase the drag area of the canopy 40 through the stage shown in FIGS. 8(*c*) and 8(*c'*) until the full open position of the parachute 34 is achieved as shown in FIGS. 8(*d*) and 8(*d'*), at which time the aircraft 32 has been materially decelerated, for example, from its initial high landing speed of one hundred eighty knots to a ground speed of seventy-five knots, assuming a twenty-seven thousand pound aircraft utilizing a thirty-three foot diameter parachute with a maximum allowable drag load of fifteen thousand pounds.

The self-programming embodiment of FIG. 9 goes through substantially the same stages in FIG. 8 as does the above-described embodiment of FIG. 7. The programming action here is different only in the fact that the apex 42–A of the canopy 40–A remains fixed via the steel cable 44–A and the relative elongation of the shroud lines 46–A with respect to the said apex 42–A is actually effected by a stretching of the shroud lines 46–A under the effect of the drag load on the canopy 40–A on the parachute 34–A.

Thus, the parachute 34–A is self-adjusting to provide a constant drag load on the aircraft 32 throughout a major portion of the landing cycle of the said aircraft. This same effect is provided in FIG. 7 by controlling the speed of the electric motor 50 in the parachute actuator 38.

Referring to FIGS. 10 and 11, the relative energy absorbing capabilities between a standard drag parachute and programmed parachutes of the present invention are illustrated.

In FIG. 10, for example, using the weight, speed and drag parameters hereinbefore defined, the constant drag effect of the programmed parachute provides a drag-runout of less than three thousand feet to decelerate the aircraft from one hundred eighty knots down to twenty-five knots while a standard drag parachute requires an excess of eight thousand feet along the runway.

In FIG. 11, the velocity versus runout characteristic of the programmed parachute is shown to have a steep negative slope while that of the standard parachute is relatively gradual. Actually the slope of the programmed parachute characteristic grows increasingly negative with runout while that of the standard parachute becomes less negative and thus less efficient with runout than the programmed parachute.

*Emergency Drag Brake for Vehicles*

Referring now to FIGS. 12, 13 and 14, a further embodiment of the present invention is shown as generally comprising a parachute container 60, mounted on top of a truck or trailer body 62, and a self-programming parachute 34-B stored in the said container.

The container 60 is provided with a friction fitted end cap 64 at the end thereof adjacent the rear of the truck body while the other end is provided with an integral end wall 66 through which is extended a squib or other suitable gas generator 68.

The parachute 34-B is substantially identical in design to the one shown in FIG. 9 and includes a canopy 40-B having an apex 42-B to which a steel cable 44-B is connected, elastic shroud lines 46-B connected at a common junction or point 58-B with the steel cable 44-B with the coupling cable 36-B extending from the common junction 58-B to an anchor point 70 on the fixed end wall 66 of the storage container 60.

The parachute 34-B is stored in a compressed collapsed condition in an inner cardboard cylinder 72 or other shape which fills and conforms to the shape of the internal cavity of the storage container 60. The closed end 74 of the inner cylinder 72 is adjacent the squib 68 forming a gas expansion chamber 76 for the gas generated by the squib 68.

Within the gas chamber 76 is a short faked length 78 of the parachute connecting cable 36-B extending from the anchor point 70 in the end wall 66 to a second anchor point 80 in the closed end wall 74 of the inner cylinder 72 through which the said cable 36-B extends.

The squib 68 is connected in an electric firing circuit including a battery 82 and a firing switch 84 connected in series with the squib 68.

*Operation*

In operation, referring to FIGS. 12, 13 and 14, the driver of the vehicle or any suitable mechanism responsive to brake failure actuates the firing switch 84 causing the battery 82 to fire the squib 68 and generate a large volume of gas in the gas chamber 78.

The high pressure generated by the gas in the chamber 78 acts against the area of the end wall 74 of the inner cylinder 72 and forces the said cylinder against the friction cap 64, sending the said end cap away from the container 60 and projecting the said cylinder along with the compressed parachute 34-B out of the container 60.

The short length 78 of the connecting cable 36-B is thus rapidly extended and finally brings the inner cylinder 72 to an immediate halt via the second anchor point 80. This causes the parachute 34-B, and the main connecting cable 36-B to project out of the inner cylinder because of their own inertia, whereby the parachute 34-B opens and begins to arrest the forward motion of the vehicle to which it is connected.

The self-programming sequence achieves a constant drag, for example, down to speeds of approximately 25 miles per hour as shown in FIGS. 15 and 16. Here, a parachute diameter of fifty feet and a six thousand pound maximum drag load are used to provide emergency braking for a sixty thousand pound truck. FIG. 15 illustrates the kinetic energy of the truck as a function of truck speed to the same scale as FIG. 15 which shows the drag load exerted on the truck by the parachute 34-B as a function of truck speed as well as a schematic representation of the degree of parachute open condition with repect to the speed of the truck. The programming action of the said parachute 34-B being in effect the same as that described for the embodiments of FIGS. 7, 8 and 9.

The effect of the parachute 34-B on the sixty thousand pound truck is plotted in FIG. 17 as percent grade versus braking distance to decelerate from a given velocity (forty and sixty miles per hour as illustrated).

As can be seen from the foregoing specification and drawings this invention provides a new and novel parachute structure per se, a new and novel personnel parachute and rate of fall control means therefor, a new and novel self-contained arresting system for aircraft, and a new and novel emergency braking system for vehicles. The new and novel parachute structure makes possible the use of much lighter weight parachutes for the purposes disclosed and all other relevant uses of parachutes with a resultant saving of material costs as well as space requirements. In addition, a programmed drag load may be effected with the parachute of the present invention which provides optimum efficiency in the arrest or drag cycle in which the said parachute is used.

It is to be understood that the several embodiments of the present invention shown and described herein are for the purpose of example only and are not intended to limit the scope of the appended claims.

What is claimed is:

1. In a means for decelerating a load body from a first to a second velocity, including a drag body, housing means for storing said drag body on said load body and ejecting said drag body therefrom to initiate deceleration thereof, said housing means comprising an elongated chamber having a fixed walled end and a releasably capped end, a substantially coextensive and conformally shaped container in said chamber containing said drag body and having an open end adjacent and a closed end adjacent said capped end and said fixed wall end of said chamber, respectively, to thereby form a gas chamber between said fixed walled end and closed ends, means tethering said closed end to said fixed walled end, connecting means for tethering said drag body to said closed end, and expansible fluid generating means communicating with said gas chamber.

2. The invention defined in claim 1, wherein said generating means comprises a power source, a firing switch and a squib interconnected therewith and controlled thereby.

3. Means for decelerating a load body from a first to a second velocity comprising a drag body and a housing means for said drag body mounted on said load body, said housing means comprising an elongated chamber having a fixed walled end and a releasably capped end, a substantially coextensive and conformally shaped container in said chamber containing said drag body and having an open end adjacent and a closed end adjacent said capped end and said fixed walled end of said chamber, respectively, to thereby form a gas chamber between said fixed walled and closed ends, means tethering said closed end to said fixed walled end, connecting means for tethering said drag body to said closed end, and expansible fluid generating means communicating with said gas chamber, and said drag body comprising a canopy, said canopy having an apex and a periphery, and control means connected with said canopy for providing relative displacement between said apex and said periphery to effect a constant drag load on said load body, said control means being connected with said connecting means.

4. The invention defined in claim 3, wherein said control means comprises a relatively inelastic line connected from said apex to said connecting means and a plurality of elastic shroud lines connected between the periphery of said canopy and a common junction with said inelastic line.

5. The invention defined in claim 3, wherein said control means comprises a steel cable connected from said apex to said connecting means and a plurality of nylon shroud lines connected between said canopy and a common point on said steel cable.

References Cited by the Examiner
UNITED STATES PATENTS

| | | | |
|---|---|---|---|
| 1,340,259 | 5/20 | Taylor | 244—152 |
| 1,378,198 | 5/21 | Smith | 244—152 |
| 2,721,716 | 10/55 | Beadle | 244—113 |
| 2,949,263 | 8/60 | Steinthal | 244—113 |
| 2,972,457 | 2/61 | Steinthal | 244—113 |
| 3,113,752 | 12/63 | Brestel | 244—152 X |

MILTON BUCHLER, *Primary Examiner.*

ANDREW H. FARRELL, *Examiner.*